United States Patent
Schiegg et al.

(10) Patent No.: US 11,675,361 B2
(45) Date of Patent: **\*Jun. 13, 2023**

(54) METHOD FOR ASCERTAINING DRIVING PROFILES

(71) Applicant: Robert Bosch GmbH, Stuttgart (DE)

(72) Inventors: Martin Schiegg, Korntal-Muenchingen (DE); Muhammad Bilal Zafar, Renningen (DE); Stefan Angermaier, Stuttgart (DE)

(73) Assignee: ROBERT BOSCH GMBH, Stuttgart (DE)

( \* ) Notice: Subject to any disclaimer, the term of this patent is extended or adjusted under 35 U.S.C. 154(b) by 498 days.

This patent is subject to a terminal disclaimer.

(21) Appl. No.: 16/844,376

(22) Filed: Apr. 9, 2020

(65) Prior Publication Data

US 2020/0333793 A1      Oct. 22, 2020

(30) Foreign Application Priority Data

Apr. 16, 2019   (DE) .......................... 102019205520.6

(51) Int. Cl.
*G05D 1/02* (2020.01)
*F01N 3/08* (2006.01)
(Continued)

(52) U.S. Cl.
CPC .............. *G05D 1/0221* (2013.01); *F01N 3/08* (2013.01); *G01C 21/3407* (2013.01);
(Continued)

(58) Field of Classification Search
CPC ...... G05D 1/0221; G05D 1/0274; F01N 3/08; G01C 21/3697; G01C 21/3407; G06N 3/0445; G06N 3/08
See application file for complete search history.

(56) References Cited

U.S. PATENT DOCUMENTS

| 8,612,107 B2 \* | 12/2013 | Malikopoulos ... B60W 30/1882 |
| | | 701/540 |
| 9,002,612 B2 \* | 4/2015 | McNew ................ G06N 20/00 |
| | | 701/93 |

(Continued)

FOREIGN PATENT DOCUMENTS

| DE | 102013200116 A1 | 7/2014 |
| DE | 102017107271 A1 | 7/2017 |
| EP | 2610836 A1 | 7/2013 |

*Primary Examiner* — Luis A Martinez Borrero
(74) *Attorney, Agent, or Firm* — Norton Rose Fulbright US LLP; Gerard Messina

(57) ABSTRACT

A computer-implemented method for training a machine learning system for generating driving profiles and/or driving routes of a vehicle including: a generator obtains first random vectors and generates first driving routes and associated first driving profiles related to the first random vectors, driving routes and respectively associated driving profiles recorded in driving mode are stored in a data base, second driving routes and respectively associated second driving profiles recorded in driving mode are selected from the database, a discriminator obtains first pairs made up of first generated driving routes and respectively associated first generated driving profiles and second pairs made up of second driving routes and respectively associated second driving profiles recorded in driving mode, the discriminator calculates outputs that characterize each pair, and a target function is optimized as a function of the outputs of the discriminator.

26 Claims, 1 Drawing Sheet

(51) Int. Cl.
*G01C 21/34* (2006.01)
*G01C 21/36* (2006.01)
*G06N 3/08* (2023.01)
*G06N 3/044* (2023.01)

(52) U.S. Cl.
CPC ....... *G01C 21/3697* (2013.01); *G05D 1/0274* (2013.01); *G06N 3/044* (2023.01); *G06N 3/08* (2013.01); *G05D 2201/0212* (2013.01); *G05D 2201/0213* (2013.01)

(56) References Cited

U.S. PATENT DOCUMENTS

| | | | |
|---|---|---|---|
| 9,102,320 B2 * | 8/2015 | McGee | F02D 41/029 |
| 9,321,447 B2 * | 4/2016 | Abuelsaad | B60W 10/06 |
| 9,371,766 B2 * | 6/2016 | Wang | F01N 9/00 |
| 9,376,971 B2 * | 6/2016 | Luther | B61L 27/16 |
| 9,446,766 B2 * | 9/2016 | Tanaka | G08G 1/0133 |
| 9,815,470 B2 * | 11/2017 | Luther | B61L 27/16 |
| 10,324,463 B1 * | 6/2019 | Konrardy | G05D 1/0278 |
| 10,551,842 B2 * | 2/2020 | Lonari | G08G 1/22 |
| 10,759,298 B2 * | 9/2020 | Wang | B60L 58/21 |
| 10,891,524 B2 * | 1/2021 | Honkala | G06N 3/045 |
| 11,048,832 B2 * | 6/2021 | Alvarez | G06F 30/15 |
| 11,078,857 B2 * | 8/2021 | Schiegg | F02D 41/1458 |
| 11,199,419 B2 * | 12/2021 | Markert | G01C 21/3469 |
| 11,200,358 B2 * | 12/2021 | Bhattacharyya | G01C 21/20 |
| 11,254,325 B2 * | 2/2022 | Milton | G08G 1/0112 |
| 11,346,678 B2 * | 5/2022 | Trancik | G06Q 10/06 |
| 2005/0166580 A1 | 8/2005 | Pfaeffle et al. | |
| 2008/0201019 A1 * | 8/2008 | Kumar | B61L 3/006 701/19 |
| 2008/0262712 A1 * | 10/2008 | Duty | B60W 10/06 701/123 |
| 2009/0234521 A1 * | 9/2009 | Kumar | B60L 15/2045 701/19 |
| 2009/0306866 A1 * | 12/2009 | Malikopoulos | B60W 30/1882 701/59 |
| 2011/0022259 A1 * | 1/2011 | Niwa | G01C 21/3415 903/903 |
| 2011/0022298 A1 * | 1/2011 | Kronberg | G01C 21/3484 701/532 |
| 2011/0313647 A1 * | 12/2011 | Koebler | B60W 50/0097 701/123 |
| 2012/0330479 A1 * | 12/2012 | Oshiro | G06Q 10/047 701/1 |
| 2013/0046466 A1 * | 2/2013 | Yucel | G01C 21/3469 701/538 |
| 2014/0094998 A1 * | 4/2014 | Cooper | B61L 15/0027 701/2 |
| 2015/0232097 A1 * | 8/2015 | Luther | B60W 30/188 701/1 |
| 2015/0239460 A1 * | 8/2015 | Manickaraj | B60W 10/26 180/65.265 |
| 2015/0298684 A1 * | 10/2015 | Schwartz | B60W 40/02 180/65.265 |
| 2016/0009304 A1 * | 1/2016 | Kumar | B61L 27/40 701/19 |
| 2017/0309092 A1 * | 10/2017 | Rosenbaum | G01M 17/007 |
| 2017/0344023 A1 * | 11/2017 | Laubinger | G08G 1/22 |
| 2018/0003516 A1 * | 1/2018 | Khasis | G08G 1/207 |
| 2018/0045526 A1 * | 2/2018 | Trancik | G06Q 10/06 |
| 2018/0141562 A1 * | 5/2018 | Singhal | G08G 1/166 |
| 2018/0364725 A1 * | 12/2018 | Lonari | B60W 10/06 |
| 2019/0012581 A1 * | 1/2019 | Honkala | G06N 3/048 |
| 2019/0017453 A1 * | 1/2019 | Dudar | G06N 5/046 |
| 2019/0048809 A1 * | 2/2019 | Fox | B60W 20/20 |
| 2019/0102960 A1 * | 4/2019 | Thibault | G07C 5/0808 |
| 2019/0185004 A1 * | 6/2019 | Kim | B60W 50/0097 |
| 2019/0339085 A1 * | 11/2019 | Naef | B60W 20/12 |
| 2020/0047629 A1 * | 2/2020 | Cho | B60L 15/2045 |
| 2020/0070679 A1 * | 3/2020 | Wang | B60L 58/21 |
| 2020/0151291 A1 * | 5/2020 | Bhattacharyya | G06N 3/08 |
| 2020/0233427 A1 * | 7/2020 | Fukuoka | G06F 18/214 |
| 2020/0240346 A1 * | 7/2020 | Schiegg | F02D 41/1405 |
| 2020/0242858 A1 * | 7/2020 | Meroux | G07C 5/085 |
| 2020/0331473 A1 * | 10/2020 | Schiegg | B60W 50/082 |
| 2020/0333152 A1 * | 10/2020 | Markert | G06N 3/08 |
| 2020/0333793 A1 * | 10/2020 | Schiegg | G01C 21/3407 |
| 2021/0108937 A1 * | 4/2021 | Fox | G01C 21/3469 |
| 2021/0172750 A1 * | 6/2021 | De Nunzio | G08G 1/0129 |
| 2021/0180970 A1 * | 6/2021 | Park | B60L 58/13 |
| 2021/0237745 A1 * | 8/2021 | Schiegg | G06N 3/047 |
| 2021/0241104 A1 * | 8/2021 | Schiegg | G06N 3/047 |
| 2022/0126864 A1 * | 4/2022 | Moustafa | B60W 50/00 |
| 2022/0180249 A1 * | 6/2022 | Schiegg | G06N 20/00 |
| 2022/0332335 A1 * | 10/2022 | Milton | G07C 5/008 |

* cited by examiner

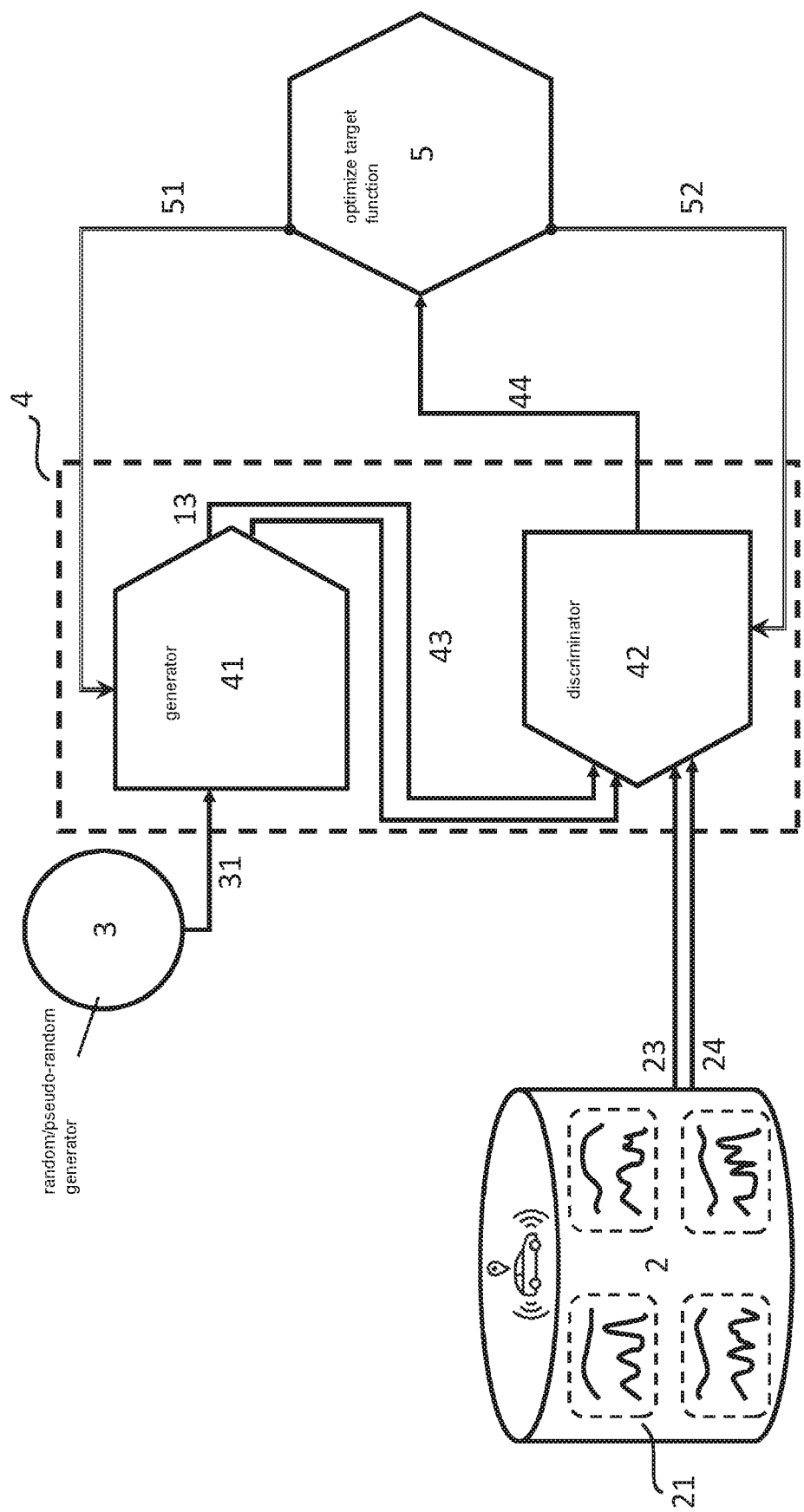

METHOD FOR ASCERTAINING DRIVING PROFILES

CROSS REFERENCE

The present application claims the benefit under 35 U.S.C. § 119 of German Patent Application No. DE 102019205520.6 filed on Apr. 16, 2019, which is expressly incorporated herein by reference in its entirety.

FIELD

The present invention relates to computer-implemented methods for generating or evaluating driving profiles of a vehicle with the aid of a machine learning system, a computer-implemented method for training such a machine learning system as well as computer programs and learning systems configured for such purpose.

BACKGROUND INFORMATION

German Patent Application No. DE 10 2017 107 271 A1 describes a method for ascertaining a control driving cycle for driving tests for ascertaining exhaust emissions of motor vehicles. In this method, speed profiles for the various driving cycles are derived on the basis of the parameter sets. The aim is to ascertain a control cycle, which reflects preferably the "maximal" emissions case within given boundary conditions.

SUMMARY

In some countries, legislation provides for the registration of new motor vehicles driven with the aid of an internal combustion engine to be made dependent on the emissions that result in real driving mode. The English expression real driving emissions is also commonly used in this case. Such motor vehicles include, for example, those that are driven exclusively by an internal combustion engine, but also those that include a hybridized power train.

For this purpose, it is provided that a tester performs one driving cycle or multiple driving cycles with the motor vehicle and that the resultant emissions are measured. The registration of the motor vehicle is then dependent on these measured emissions. The driving cycle in this case may be freely selected by the tester within broad limits. A typical duration of a driving cycle in this case may, for example, be 90 to 120 minutes.

Motor vehicle manufacturers are therefore faced with the challenge in the development of motor vehicles of having to foresee early in the development process of a new motor vehicle whether or not the emissions of this motor vehicle remain within the legally prescribed limits in each admissible driving cycle.

It is therefore essential to provide methods and devices, which are able to safely predict the anticipated emissions of the motor vehicle already in the developmental stage of a motor vehicle, in order to be able to implement changes in the motor vehicle in the event of an anticipated exceedance of limit values. Such an estimation based solely on measurements on a test bench or in a driving motor vehicle is extremely cumbersome due to the wide variety of possible driving cycles.

Thus, it is provided in the related art, for example, to determine so-called control cycles, for which the fulfillment of emission regulations is particularly challenging. In the process, it is assumed that the emission regulations will be fulfilled presumably for all possible driving cycles if this is the case for the most challenging cycles.

However, in addition to the requirement of having to fulfill emission regulations in every possible or admissible driving cycle, it is an important aim of a vehicle development or drive development to minimize the total emissions of a vehicle drive system during real operation. An adaptation or optimization of a vehicle drive system to the most critical or particularly critical driving cycles may potentially ensure the fulfillment of standards in all cycles, but there is a risk of a significant deterioration of the emissions in less critical cycles as a result. If the less critical cycles are then also the more frequent cycles in real driving mode, which is frequently the case, the entire system with respect to emissions during real operation deteriorates as a result of such an optimization. For example, an optimization of the emissions in a critical, but in reality very rare driving cycle that includes an extreme speed profile (for example, extreme mountain driving with strong accelerations) may result in the emissions deteriorating for less critical, but much more frequent driving cycles that include a normal speed profile (for example, short city driving with traffic lights), which may lead to higher emissions on the whole during real operation.

It is therefore a great advantage for the development of emissions-optimized vehicles that include internal combustion engines to be able to automatically generate a large number of realistic speed profiles, whose distribution of the generated speed profiles corresponds to or approximates an actually to be expected distribution. The aim is therefore to generate speed profiles that include a distribution representative of real operation.

In addition to the development of low emission drive systems or an emissions-optimized application of such drive systems, it is possible to advantageously use such generated speed profiles also during predictive driving, for example, in the battery management of an electric vehicle or of an E-bike, in the drive management of a hybrid vehicle, in the regeneration management of exhaust gas components of a vehicle that includes an internal combustion engine. Such generated speed profiles may also provide a valuable contribution in the ascertainment of load spectra and stress scenarios for specifying components, for example, which stress is experienced by a particular part such as, for example, a pump over its lifetime.

Thus, the computer-assisted generation of speed profiles in a distribution representative of real operation represents an important technical task, which may decisively improve the development or optimization of a vehicle in various scenarios, and thus contribute to lower-emission and more efficient vehicles, in particular, to lower-emission and more efficient drive systems of vehicles.

In a first aspect of the present invention, therefore, a computer-implemented method is provided for training a machine learning system for generating driving profiles of a vehicle.

Driving profiles in this case refer to profiles of driving characteristics of a vehicle, the driving characteristics being measurable using sensors, in particular, physical or technical characteristics of the power train of the vehicle, which characterize the forward movement of a vehicle. The most important variant included under the driving profiles are the speed profiles of the vehicle. The speed profile of a vehicle is one or is the leading variable for determining emissions, consumption, wear and comparable variables for a particular drive. A speed profile in this case may be determined by speed values, but also by variables derived therefrom, such as acceleration values. Other important driving characteristics, whose profiles are needed for applications such as determining emissions, consumption or wear include, in particular, a position of the accelerator pedal or a transmission ratio.

The example training method in this case has the following steps:
a generator of the machine learning system obtains random vectors as input variables and generates in each case first driving routes and associated first driving profiles relating to the random vectors,
driving routes and respectively associated driving profiles recorded in driving mode are stored in a data base,
second driving routes and respectively associated second driving profiles recorded in driving mode are selected from the database,
a discriminator of the machine learning system obtains as input variables pairs made up of one of the first driving routes including a respectively associated first generated driving profile and pairs made up of second driving routes including a respectively associated second driving profile recorded in driving mode,
the discriminator calculates as a function of the input variables outputs, which characterize and reflect or quantify for each pair obtained as input variables, whether it is a pair including a first, generated driving profile or a pair including a second driving profile recorded in driving mode,
a target function is calculated, in particular, optimized as a function of the outputs of the discriminator, which represents and reflects or quantifies a distance or a divergence between the distribution of the pairs including first generated driving profiles and the distribution of the pairs including second profiles recorded in driving mode.

Parameters of the machine learning system are preferably adapted as a function of the optimization of the target function in such a way that
a. the discriminator is optimized to differentiate between the first, generated driving profiles and the second driving profiles recorded in driving mode,
b. the generator is optimized to generate first, generated driving profiles in a first distribution, which are preferably difficult to differentiate via the discriminator from second driving profiles recorded in driving mode, which are present in a second distribution.

In a preferred embodiment of the present invention, the parameters of the machine learning systems are adapted to the target function as a function of a gradient.

The example training methods described herein provide a computer-implemented machine learning system, with which representative driving profiles and representative driving routes or representative pairs of driving profiles and driving routes may be generated, as a result of which, in turn, measures such as an emissions optimization or a validation of a system with respect to emissions while taking the actual representative effects into consideration may take place. Routes including the route characteristic gradient, for example, may be generated as representative driving routes, and speed profiles as representative driving profiles. With these generated variables combined, it is possible to carry out diverse optimizations of drive systems or their validation in an automated manner.

The target function is preferably implemented as a static distance such as, for example, a Jenson-Shannon distance. The target function is preferably implemented as the Wasserstein metric, in particular, a Wasserstein distance between a first distribution of the first driving profiles and a second distribution of the second driving profiles. Thus, the distribution of the generated data advantageously reflects the full variance of the distribution of the measured data, a so-called mode collapse is prevented. A more stable and more efficient training and better convergence are also enabled, since this target function prevents vanishing gradients. The target function is robust with respect to many optimization steps in the discriminator. In order to optimize the use of a Wasserstein metric as the target function, it is provided in preferred embodiments to expand the target function to include a regulator or to carry out a weight clipping.

In addition, the input variables of the generator and of the discriminator may each include additional pieces of information, in particular, driver characteristics and/or vehicle characteristics. With such, in particular, also not discretized, additional pieces of information, it is possible to also condition the driving profiles to additional variables, for example, a motorization of the vehicle or an experience of the driver, which allows for more accurate adaptations and conclusions as a function of the generated driving profiles.

The random vectors are generated, in particular, by a random generator. The random variables may preferably be implemented on the one hand as global random vectors or as temporary or local random vectors. Alternatively, the random variables may also be implemented as a combination of global and of temporary or local random vectors. The combination of global and temporary/local random vectors proves to be particularly advantageous, since variances in the data may thus be reflected, both on the basis of global and also on the basis of local or temporary influences.

In preferred embodiments of the present invention, the generator and/or the discriminator is/are each implemented as a neural network, in particular, as a recurrent neural network. In this way, it is possible to also generate or evaluate driving profiles of arbitrary length, the transitions between sections of the driving profiles always being consistent with the learned transition model. The recurrent neural network in this case may be implemented, in particular, as a long short-term memory (LSTM) neural network or as gated recurrent units (GRU).

In preferred embodiments of the present invention, it also becomes advantageously possible to take so-called anticipatory driving into consideration. In this case, it is considered that the speed of a vehicle is able to adapt already to future or subsequent route characteristics via driver behavior or also via automatic vehicle interventions, for example, via an already visible traffic light, a known following speed limit, etc. For this purpose, the generator may be implemented in a preferred embodiment as a bidirectional recurrent neural network.

In further aspects of the present invention, the elements of the machine learning system trained using the training methods presented may be used as computer-implemented systems, in order to generate (generator) or to evaluate (discriminator) driving profiles.

An ascertainment of route-specific emissions of a drive system of a vehicle may, in particular, take place as a function of driving profiles generated in such a manner, for example, in a simulation, in which a model of the drive system is calculated. Such a model in this case may include sub-models, which describe an engine and an exhaust gas after-treatment system of the drive system.

With route-specific emissions of a drive system of a vehicle ascertained as a function of such generated driving profiles, it is then possible in turn for a validation or adaptation of the drive system, in particular, an emissions-minimizing adaptation, to take place.

As previously described, an adaptation may take place in this case as a result of the representative distribution of the generated driving profiles, which does not optimize the drive system with respect to emissions to individual or particularly critical driving profiles. Instead, an optimization of the drive system is made possible in such a way that the emissions to be expected in real operation are on the whole minimized.

The optimization in this case may take place via an adaptation of components or parameters in the development of the drive system, via an adaptation of data in an application of the drive system or via an adaptation of control variables in the operation of the drive system in the vehicle.

To carry out the described, example computer-implemented methods, computer programs may be configured and stored in machine-readable memories. A computer-implemented learning system including such a machine-readable memory may be configured to carry out the methods, the calculations to be carried out being carried out by one or by multiple processors of the computer-implemented learning system.

BRIEF DESCRIPTION OF THE DRAWING

FIG. 1 shows by way of example a computer-implemented training method for a machine learning system in accordance with the present invention.

DETAILED DESCRIPTION OF EXAMPLE EMBODIMENTS

Driving routes or routes of vehicles together with one associated driving profile each are stored in a database 2. An exemplary pair made up of a route and an associated driving profile in database 2 is identified by 21 in FIG. 1. The driving profiles in database 2 correspond in this case to driving profiles ascertained or measured in the driving mode of the vehicle. This means, the driving profiles have preferably been recorded and stored by sensors of the vehicle during the actual driving of the associated route by a vehicle. In this case, database refers solely to data systematically stored in a machine-readable memory.

A generator 41 is then to be trained in machine learning system 4 to generate driving profiles as well as associated driving routes. These driving profiles are to be determined as a function of random input variables, for which random variables may be provided as random vectors in Block 3. A random generator, in particular, may be implemented in block 3, in which case it may also be a pseudo-random generator.

The driving profiles generated by generator 41 are particularly to be preferably undistinguishable or barely distinguishable from the driving profiles from database 2 ascertained in driving mode. For this purpose, a discriminator 42 is trained to be able to preferably readily distinguish between driving profiles generated by generator 41 and driving profiles drawn from database 2 or between the respective pairs made up of driving profiles and driving routes or route characteristics. The learning system in this case is to generate not only individual driving profiles and driving routes, which are preferably undistinguishable or barely distinguishable from individual driving profiles ascertained in driving mode. Instead, the distribution of the generated driving profiles and driving routes in the parameter space of the input variables is also to be preferably close to the distribution of the driving profiles and driving routes in the parameter space of the input variables ascertained in driving mode, i.e., a representative distribution of driving profiles and driving routes is achieved.

The training of machine learning system 4 includes for this purpose the optimization of a target function 5, depending on which parameter of generator 41 and of discriminator 42 are adapted.

The provided training of machine learning system 4 is described below in greater detail with reference to FIG. 1.

A route is determined, in particular, as a sequence of discrete data points, route characteristics for each data point or for each discretization step being stored in this discretization step. This applies, in particular, to generated routes and to routes stored in the database.

A route r, for example, has a length N: $r=(r_1, \ldots, r_N)$. Each data point $r_t$ corresponds to a discretization step. Implementations, in which the discretization steps correspond to a chronological or spatial discretization, are particularly preferred. In the chronological discretization, the data points each correspond to a time elapsed since the start of the route and thus the sequence of data points corresponds to a chronological profile. In the case of spatial discretization, the data points each correspond to a distance travelled along the route.

The sampling rate is generally constant. In a chronological discretization, the sampling rate may be defined, for example, as x seconds, in a spatial discretization, for example, as x meters.

Each data point $r_t$ of the route describes the route characteristics at the corresponding discretization step, i.e., $r_t \in R^D$. D is the number of the route characteristics, in this case each dimension of multidimensional route characteristics being counted as one dimension of a one-dimensional route characteristic.

Such route characteristics may, for example, be related in each case to the discretization step, in particular, to the point in time or time interval or to the location or to the route or to the distance:
  geographical characteristics such as absolute elevation or gradient
  characteristics of the traffic flow such as time-dependent average speed of traffic
  roadway characteristics such as number of lanes, type of roadway or roadway curvature
  characteristics of traffic routing such as speed limits, number of traffic lights or number of particular traffic signs, in particular, stop or yield right of way or pedestrian crosswalks
  Weather characteristics such as amount of rain at the predefined point in time, wind speed, presence of fog In this case, the generated routes and the routes stored in the database, in particular, are determined by the same route characteristics or types of route characteristics.

A random vector is ascertained in block 3 and is conveyed to generator 41 in step 31. A random vector z is drawn, i.e., randomly ascertained. In this case, z corresponds, in particular, to $R^L$, L optionally capable of being a function of the length of route N. The distribution from which the z is drawn is preferably fixed at a simple distribution family, for example, Gaussian distribution or uniform distribution.

Thus, the input variables of generator 41 include at least random vector z. Generator 41 then generates driving profiles and driving routes as a function of the input variables (step 31). Generator 42 includes a computer-implemented algorithm for this purpose, with which a generative model is implemented and which outputs driving profiles and driving routes (step 43).

Such a driving profile generated by generator 41 may, for example, be output as $x=(x_1, \ldots, x_N)$ and, like the generated associated driving route, be present discretized over location. Alternatively, the generated route characteristics, i.e., the driving route, may, for example, be present discretized over location but the generative driving profile, i.e., for example, the generated speeds, may be present discretized over time.

To influence or to establish the length of the generated driving profiles and driving routes, it is possible in one preferred embodiment to also specify to generator 41 the length N of the driving profiles and driving routes to be generated. This may be either a fixed or configurable value or may be sampled in a preferred variant from a distribution that is representative of the true distribution of the route lengths. This distribution may, for example, be extracted from the database described or from another database. If a recurrent neural network is used as generator 41, the generation may then be aborted after N steps or N may be provided as an additional input variable of generator 41.

In one alternative embodiment, a particular abort criterion, in particular, a randomly marked abort criterion is defined, which determines the length of the generated data (driving profile, driving route) during the generation. A specific symbol (for example, $, −1, NAN) may be introduced, for example, which signals the end of the route. As soon as generator 41 generates this sign for the first time, the route is ended.

The generative model is parameterized via parameters $\theta_G$. The architecture of the generative model may, for example, be a recurrent neural network. The computer-implementation of the generator takes place by storing the algorithm that implements the generative model, as well as the parameters of the model in a machine-readable memory, by executing the calculation steps of the algorithm via a processor, and by storing the generated driving profiles in a machine-readable memory.

In one possible embodiment of the present invention, the driving profiles may be generated having a fixed length, i.e., having a fixed number of discretization steps or data points. When generating longer driving profiles, multiple generated short time series would have to be appended to one another. The transitions in this case would generally be inconsistent, however. In one alternative embodiment, the method may be expanded in such a way that driving profiles of arbitrary length may also be generated or evaluated and the transitions are always consistent with the learned transition model. For this purpose, both the generator as well as the discriminator are preferably implemented as a recurrent neural network, for example, as a long short-term memory (LSTM) neural network or as gated recurrent units (GRU). Architecturally, the generator is designed preferably as a vector-to-sequence model, but may also be implemented as a sequence-to-sequence model. The discriminator is designed preferably as a sequence-to-scalar model, but may also be implemented as a sequence-to-sequence model.

There are various options for the architecture of the generative model as a recurrent neural network.

For example, a global random vector z may be sampled for the complete driving profile, the designation global, in turn, capable of being related to a chronological or spatial discretization. In this embodiment, characteristics are taken into consideration or learned in the latent space, which globally change the driving profile, for example, characteristics consistent over the route such as consistent driver characteristics (for example, age or experience), consistent weather characteristics (for example, continuous rain) or consistent vehicle characteristics (for example, motorization). This random vector may then either be used for initializing the hidden state (hidden states) in the first time step or/and be fed to the recurrent neural network in each time step.

Local or temporary random vectors z may also be sampled, i.e., in the latent space, characteristics are taken into consideration or learned which locally or temporarily change the driving profile, for example, short-term characteristics such as short-term traffic routing characteristics or traffic flow characteristics (states of traffic lights, backlog at an intersection, pedestrian on the roadway). A random vector in this case is regenerated at an interval of M time steps and fed to the recurrent neural network, where M>0. M may also be stochastic, i.e., the random vector may also be changed in random intervals.

In one preferred embodiment of the present invention, a combination of global and local or temporary random vectors may also be implemented. Some dimensions of the random vector in this case are sampled only once per driving profile, the remaining dimensions change every M time steps. For this purpose, a global random vector may alternatively also be fed to the recurrent neural network, in principle, in each time step, it being replaced every M time steps by a local (i.e., newly sampled) random vector.

The combination of a global and local random vector proves to be particularly advantageous, since variances in the data based both on global as well as on local or temporary influences may thus be reflected.

Anticipatory or predictive driving may preferably also be taken into consideration in the generative model.

Thus, a bidirectional recurrent neural network may be used as a generative model, in which a hidden state of future cells of the recurrent neural network is also taken into consideration. In this way, it is possible to explicitly include all possible future time steps.

Thus, instead of conditioning the generation of a speed or route characteristic at point in time t solely to the inner state at instantaneous point in time t (and, if necessary to a hidden state of point in time t−1), it is possible to also include future inner states and therefore indirectly also future route characteristics and speed profiles for the generation of the speed at point in time t. This makes it possible to simulate so-called "anticipatory driving," for example, the early response of a driver, particularly in terms of a speed adaptation, to a route characteristic (for example, traffic light, speed limit, expressway exit, etc.) already visible in the distance. The ability of the algorithm to learn to return to speed 0 at the end of a route, for example, in that only default values such as, for example, 0 for future route characteristics, are present at the end of a route, is also made possible.

In database 2, the routes determined in this way are each stored together with a driving profile associated with the route actually measured in driving mode. These pairs made up of route and associated driving profile serve the machine learning system as training data. For this training, pairs made up of route and associated driving profile, in particular, are selected and conveyed to discriminator 42 in steps 23 and 24. In addition, pairs made up of a generated driving route and a driving profile generated by generator 41 as a function of this route are also conveyed to discriminator 42 in steps 13 and 43.

Discriminator 42 has a computer-implemented algorithm, with which a discriminative model is implemented. Discriminator 42 obtains as input variables a pair made up of a route and an associated driving profile and decides whether the viewed pair contains a generated (by generator 41)

driving profile or an actually measured driving profile (obtained from database 2). The result of this decision is output in step 44. Discriminator 42 may, for example, output a value >0 for the decision "real driving profile" and <0 for the decision "generated driving profile." Alternatively, previously established values such as class labels may, for example, also be output. The discriminative model is parameterized via parameter $\theta_D$. Output 44 of the decision contains, in particular, a valuation beyond the "yes"/"no" binary decision.

The computer implementation of the discriminator takes place by storing the algorithm that implements the discriminative model, as well as the parameters of the model in a machine-readable memory, by executing the calculation steps of the algorithm via a processor and by storing the output in a machine-readable memory.

Discriminator 42 may, for example, be implemented as a recurrent neural network. In this way, it is possible to evaluate, in particular, driving profiles of arbitrary length.

There are multiple embodiments for the evaluation (decision generated driving profiles and driving routes versus driving profiles and route characteristics ascertained in driving mode). The evaluation may be made again, in particular, after each individual time step. The global evaluation of the driving profile and of the driving routes is then, for example, the average of the individual evaluations or the majority decision. Alternatively, the evaluation of the entire driving profile as well as of the entire driving routes may also only be made for the last time step. The latter embodiment saves, in particular, additional calculation steps and has the further advantage that the complete driving profile and the complete driving route are equally incorporated into the evaluation.

In block 5, a target function is optimized, in particular, a loss function is minimized, as a function of output 44 of discriminator 42. For this purpose, the input variables of the discriminator are labeled, in particular, as real samples (i.e., pairs including driving profiles determined in driving mode) or as generated samples (i.e., pairs including driving profiles generated by generator 41). The target function in this case characterizes to what extent the generated driving profiles correspond to actually measured driving profiles or to what extent the distribution of the generated driving profiles in the parameter space correspond to the distribution of the measured driving profiles in the parameter space. Parameters $\theta_G$ of generator 41 or of the generative model implemented there, as well as parameters $\theta_D$ of discriminator 42 or of the discriminative model implemented there are adapted as a function of the adaptation of the target function. There parameters in this case are adapted, in particular, with respect to the gradient of the target function.

The target function is selected in such a way that it characterizes or represents a difference or a distance between the distribution of the generated driving profiles and driving routes and the distribution of the driving profiles and driving routes ascertained in driving mode, or a difference or a distance between the distribution of the routes-driving profile pairs including generated driving profiles and the distribution of the routes-driving profile pairs including driving profiles ascertained in driving mode. By selecting such a target function, the machine learning system may be trained in such a way that the distribution of the generated data reflects the full variance of the distribution of the measured data. A so-called mode collapse is prevented. This means, a representative distribution of the driving profiles and driving routes is provided. The target function in this case takes into consideration, in particular, also the variance of the unobservable influences.

For this purpose, a loss function (loss) is preferably selected as a target function, which is implemented as a Wasserstein metric or a Wasserstein distance between the distributions.

In this example embodiment of the computer-implemented training, the discriminator is limited preferably to Lipschitz-limited functions. In one preferred embodiment, the target function is expanded by regularizer terms for this purpose, for example, a gradient penalty or a centering (i) of the gradient of the real samples (this means the pairs including driving profiles determined in driving mode) to 0 or (ii) of the gradient of generated samples (this means the pairs including generated driving profiles) to 0 or (iii) of the gradient of samples, which represent the mean made up of real and generated samples, to 1. The option "center gradient of real samples to 0" is particularly preferred in this case, since this has proven to be the quickest of the options and results in a particularly quick convergence of the optimization problem. Alternatively, a weight clipping may take place after each gradient step.

The previously described method for the computer-implemented training of the entire learning system, including generator 41 and discriminator 42, may be described as a min-max training goal. Discriminator 42 in this case maximizes its correct classification rate, while generator 41 minimizes the correct classification rate by generating preferably driving profiles and driving routes that misdirect discriminator 42.

In addition to the described input variables of generator 41, the latter may also be provided additional input variables. In addition to the random vectors, for example, pieces of information about driving characteristics (such as experience, age, aggressiveness or driving style, etc.) or pieces of vehicle information (such as performance, motorization, type of drive system, etc.) may be stored. The generated driving profiles may thus also be conditioned to these additional pieces of information. In this case, corresponding pieces of information relating in each case to the driving routes stored in database 2 are advantageously also stored for the training of machine learning system 4. The discriminator is provided these additional pieces of information relating to the pieces of route information and driving profiles from database 2 (step 23) as input variables.

An example computer-implemented machine learning system, which is trained using the described training method, is able to generate representative driving profiles and driving routes or to generate representative pairs made up of driving profiles and driving routes. For this purpose, the generator of the machine learning system thus trained may be fed random variables and, if necessary, additional pieces of information, and the generator generates associated driving profiles and driving routes. Such generated driving profiles and or driving routes may be used for simulating emissions of a vehicle and thus, for example, for the probabilistic assessment for maintaining emission standards and for emission optimization. The emission optimization may take place, for example, via an adaptation of the drive system in the development, via an optimization of the data application of the drive system, for example, of a control unit for controlling the drive system, or via an adaptation of control variables of the drive system in the vehicle for optimizing emissions. In the latter case, the generation of the driving profiles and driving routes may take place, in particular, in the vehicle.

The driving profiles and/or driving routes may also be used for optimizing predictive driving, for example, in the battery management of an electric vehicle or E-bike, in the drive management of a hybrid vehicle, in the regeneration management of exhaust gas components of a vehicle that includes an internal combustion engine. The optimization may, in turn, take place in the development, by optimizing a corresponding control unit application or by adapting control variables of the corresponding systems in the vehicle.

Driving profiles and/or driving routes generated in such a way may also provide a valuable contribution for ascertaining load spectra and stress scenarios for the specification of components, for example, which stress is experienced by a particular component such as, for example, a pump over its lifetime.

What is claimed is:

1. A computer-implemented method for training a machine learning system for generating driving profiles and/or driving routes, comprising the following steps:
    obtaining, by a generator of the machine learning system, first random vectors as input variables, and generating, by the generator, first driving routes and associated first driving profiles as a function of the first random vectors;
    storing, in a database, driving routes and respectively associated driving profiles recorded in driving mode;
    selecting second driving routes and respectively associated second driving profiles recorded in driving mode from the database;
    obtaining as input variables, by a discriminator of the machine learning system, first pairs made up of the first generated driving routes and the respectively associated first generated driving profiles and second pairs made up of the second driving routes and the respectively associated second driving profiles recorded in driving mode;
    calculating, by the discriminator, as a function of the input variables, outputs that characterize for each pair obtained as the input variables, whether it is a pair made up of a first generated driving route and a respectively associated first driving profile or a pair made up of a second driving route and a respectively associated second driving profile recorded in driving mode; and
    optimizing a target function, which represents a distance between a distribution of the first pairs and a distribution of the second pairs, as a function of the outputs of the discriminator.

2. The method as recited in claim 1, wherein the machine learning system generates speed profiles of a vehicle, or profiles of accelerator pedal positions or the vehicle, or profiles of a transmission ratio of the vehicle.

3. The method as recited in claim 1, wherein parameters of the machine learning system are adapted as a function of the optimization of the target function in such a way that:
    the discriminator is optimized to distinguish between the first generated driving routes and the respectively associated first generated driving profiles and the second driving routes and the respectively associated second driving profiles recorded in driving mode, and
    the generator is optimized to generate the first generated driving routes and the respectively associated first generated driving profiles in a first distribution.

4. The method as recited in claim 3 wherein the first generated driving routes and the respectively associated first driving profiles are difficult to distinguish, by the discriminator, from the second driving routes and the respectively associated second driving routes recorded in the driving mode, present in a second distribution.

5. The method as recited in claim 3, wherein the parameters of the machine learning system are adapted as a function of a gradient of the target function.

6. The method as recited in claim 1, wherein a statistical distance between: (i) a first distribution of the first generated driving routes and the respectively associated first generated driving profiles, and (ii) a second distribution of the second driving routes and the respectively associated second driving profiles recorded in driving mode, is implemented as the target function.

7. The method as recited in claim 6, wherein the target function is implemented as a Jenson-Shannon distance or a Wasserstein metric or a Wasserstein distance, between: (i) the first distribution of the first generated driving routes and the respectively associated first generated driving profiles, and (ii) the second distribution of the second driving routes and the respectively associated second driving profiles recorded in driving mode.

8. The method as recited in claim 7, wherein the target function includes a regulator, or a weight clipping.

9. The method as recited in claim 1, wherein the first and the second driving routes are data present in chronological or spatial discretization steps, a respective route characteristic being stored for each of the first and second driving routes in each discretization step.

10. The method as recited in claim 9, wherein the respective route characteristics include a geographical characteristic of the respective route, and/or a traffic flow characteristic of the respective route, and/or a roadway characteristic of the respective route, and/or a traffic routing characteristic of the respective route, and/or a weather characteristic of the respective route.

11. The method as recited in claim 1, wherein the input variables of the generator and of the discriminator include additional pieces of information, the additional pieces of information including driver characteristics and/or vehicle characteristics.

12. The method as recited in claim 1, wherein the random vectors are implemented as global random vectors or as temporary random vectors or as local random vectors.

13. The method as recited in claim 1, wherein the random vectors are implemented as a combination of (i) global random vectors, and (ii) temporary or local random vectors.

14. The method as recited in claim 1, wherein the generator and/or the discriminator is a neural network.

15. The method as recited in claim 1, wherein the generator and/or the discriminator is a recurrent neural network.

16. The method as recited in claim 15, wherein the generator is implemented a bidirectional recurrent neural network.

17. The method as recited in claim 1, wherein a length of the first generated driving routes and the respectively associated first generated driving profiles is determined as a function of a predetermined or configurable input variable or as a function of an abort criterion.

18. A method for generating a driving profile and/or a driving route of a vehicle, the method comprising the following steps:
    training a machine learning system for generating the driving profiles and/or the driving routes, the training including the following steps:
        obtaining, by a generator of the machine learning system, first random vectors as input variables, and generating, by the generator, first driving routes and associated first driving profiles as a function of the first random vectors, storing, in a database, driving routes and respectively associated driving profiles recorded in driving mode, selecting second driving routes and respectively associated second driving profiles recorded in driving mode from the database, obtaining as input variables, by a discriminator of the machine learning system, first pairs made up of the first generated driving routes and the respectively associated first generated driving profiles and second pairs made up of the second driving routes and the respectively associated second driving profiles recorded in driving mode, calculating, by the discriminator, as a function of the input variables, outputs that characterize for each pair obtained as the input variables, whether it is a pair made up of a first generated driving route and a respectively associated first driving profile or a pair made up of a second driving route and a respectively associated second driving profile recorded in driving mode, and optimizing a target function, which represents a distance between a distribution of the first pairs and a distribution of the second pairs, as a function of the outputs of the discriminator; and generating the driving profile using the generator of the trained machine learning system.

19. A method for evaluating a driving profile and/or driving route of a vehicle, the method comprising the following steps:

training a machine learning system for generating the driving profiles and/or the driving routes, the training including the following steps:

obtaining, by a generator of the machine learning system, first random vectors as input variables, and generating, by the generator, first driving routes and associated first driving profiles as a function of the first random vectors, storing, in a database, driving routes and respectively associated driving profiles recorded in driving mode, selecting second driving routes and respectively associated second driving profiles recorded in driving mode from the database, obtaining as input variables, by a discriminator of the machine learning system, first pairs made up of the first generated driving routes and the respectively associated first generated driving profiles and second pairs made up of the second driving routes and the respectively associated second driving profiles recorded in driving mode, calculating, by the discriminator, as a function of the input variables, outputs that characterize for each pair obtained as the input variables, whether it is a pair made up of a first generated driving route and a respectively associated first driving profile or a pair made up of a second driving route and a respectively associated second driving profile recorded in driving mode, and optimizing a target function, which represents a distance between a distribution of the first pairs and a distribution of the second pairs, as a function of the outputs of the discriminator; and assessing the driving profile and/or driving route using the discriminator of trained machine learning system.

20. A method for ascertaining route-specific emissions of a drive system of a vehicle, the method comprising the following steps:

training a machine learning system for generating the driving profiles and/or the driving routes, the training including the following steps:

obtaining, by a generator of the machine learning system, first random vectors as input variables, and generating, by the generator, first driving routes and associated first driving profiles as a function of the first random vectors, storing, in a database, driving routes and respectively associated driving profiles recorded in driving mode, selecting second driving routes and respectively associated second driving profiles recorded in driving mode from the database, obtaining as input variables, by a discriminator of the machine learning system, first pairs made up of the first generated driving routes and the respectively associated first generated driving profiles and second pairs made up of the second driving routes and the respectively associated second driving profiles recorded in driving mode, calculating, by the discriminator, as a function of the input variables, outputs that characterize for each pair obtained as the input variables, whether it is a pair made up of a first generated driving route and a respectively associated first driving profile or a pair made up of a second driving route and a respectively associated second driving profile recorded in driving mode, and optimizing a target function, which represents a distance between a distribution of the first pairs and a distribution of the second pairs, as a function of the outputs of the discriminator;

generating the driving profile using the generator of the trained machine learning system; and ascertaining the route-specific emissions as a function of the generated driving profile.

21. The method as recited in claim 20, wherein the emissions are ascertained in a simulation, in which a model of a drive system of a vehicle is calculated.

22. The method as recited in claim 21, wherein the model of the drive system includes sub-models, which describe an engine and an exhaust gas after-treatment system of the drive system.

23. A method for adapting a drive system of a vehicle, the method comprising the following steps:

training a machine learning system for generating the driving profiles and/or the driving routes, the training including the following steps:

obtaining, by a generator of the machine learning system, first random vectors as input variables, and generating, by the generator, first driving routes and associated first driving profiles as a function of the first random vectors, storing, in a database, driving routes and respectively associated driving profiles recorded in driving mode, selecting second driving routes and respectively associated second driving profiles recorded in driving mode from the database, obtaining as input variables, by a discriminator of the machine learning system, first pairs made up of the first generated driving routes and the respectively associated first generated driving profiles and second pairs made up of the second driving routes and the respectively associated second driving profiles recorded in driving mode, calculating, by the discriminator, as a function of the input variables, outputs that characterize for each pair obtained as the input variables, whether it is a pair made up of a first generated driving route and a respectively associated first driving profile or a pair made up of a second driving route and a respectively associated second driving profile recorded in driving mode, and optimizing a target function, which represents a distance between a distribution of the first pairs and a distribution of the second pairs, as a function of the outputs of the discriminator;

generating the driving profile using the generator of the trained machine learning system;

ascertaining the route-specific emissions as a function of the generated driving profile; and adapting a drive system of the vehicle as a function of the route-specific emissions.

24. The method as recited in claim 23, wherein the adaptation takes place: (i) via an adaption of components or parameters in the development of the drive system, or (ii) via an adaptation of data in an application of the drive system, or (iii) via an adaptation of control variables in an operation of the drive system in the vehicle.

25. A non-transitory machine-readable memory medium on which is stored a computer program for training a machine learning system for generating driving profiles and/or driving routes, the computer program, when executed by a computer, causing the computer to perform the following steps:

obtaining, by a generator of the machine learning system, first random vectors as input variables, and generating, by the generator, first driving routes and associated first driving profiles as a function of the first random vectors;

storing, in a database, driving routes and respectively associated driving profiles recorded in driving mode;

selecting second driving routes and respectively associated second driving profiles recorded in driving mode from the database;

obtaining as input variables, by a discriminator of the machine learning system, first pairs made up of the first generated driving routes and the respectively associated first generated driving profiles and second pairs made up of the second driving routes and the respectively associated second driving profiles recorded in driving mode;

calculating, by the discriminator, as a function of the input variables, outputs that characterize for each pair obtained as the input variables, whether it is a pair made up of a first generated driving route and a respectively associated first driving profile or a pair made up of a second driving route and a respectively associated second driving profile recorded in driving mode; and optimizing a target function, which represents a distance between a distribution of the first pairs and a distribution of the second pairs, as a function of the outputs of the discriminator.

26. A computer-implemented machine learning system including a non-transitory machine-readable memory medium, the machine learning system configured to generate driving profiles and/or driving routes, the machine learning system comprising:

a generator configured to obtain first random vectors as input variables, and generate first driving routes and associated first driving profiles as a function of the first random vectors;

a database which stores driving routes and respectively associated driving profiles recorded in driving mode;

a discriminator configured to obtain as input variables first pairs made up of the first generated driving routes and the respectively associated first generated driving profiles and second pairs made up of second driving routes and respectively associated second driving profiles recorded in driving mode, the second driving routes and the respectively associated second driving profiles recorded in driving mode being selected from the database, wherein the discriminator is configured to calculate, as a function of the input variables, outputs that characterize for each pair obtained as the input variables, whether it is a pair made up of a first generated driving route and a respectively associated first driving profile or a pair made up of a second driving route and a respectively associated second driving profile recorded in driving mode; and an optimized target function, which represents a distance between a distribution of the first pairs and a distribution of the second pairs, as a function of the outputs of the discriminator.

\* \* \* \* \*